United States Patent [19]
Omote

[11] Patent Number: 5,338,914
[45] Date of Patent: Aug. 16, 1994

[54] THERMAL CUTTING MACHINE

[75] Inventor: Kenji Omote, Komatsu, Japan

[73] Assignee: Kabushiki Kaisha Komatsu Seisakusho, Tokyo, Japan

[21] Appl. No.: 28,316

[22] Filed: Mar. 9, 1993

[30] Foreign Application Priority Data

Mar. 11, 1992 [JP] Japan .................. 4-052403
May 1, 1992 [JP] Japan .................. 4-112503

[51] Int. Cl.⁵ .............................................. B23K 26/00
[52] U.S. Cl. ...................... 219/121.67; 219/121.82
[58] Field of Search ............... 219/121.67, 121.72, 219/121.82, 124.1, 125.1

[56] References Cited

U.S. PATENT DOCUMENTS

| | | | |
|---|---|---|---|
| 3,612,814 | 10/1971 | Houldcroft | 219/121.67 |
| 3,711,010 | 1/1973 | McConnell | 219/125.1 X |
| 3,828,159 | 8/1974 | Zoot | 219/121.67 |
| 3,889,095 | 6/1975 | Egan | 219/121.82 |
| 5,128,512 | 7/1992 | Seki | 219/121.82 |
| 5,272,311 | 12/1993 | Gilli et al. | 219/121.67 |

FOREIGN PATENT DOCUMENTS 63-224893 9/1988 Japan .
3-31548 5/1991 Japan .

Primary Examiner—C. L. Albritton
Attorney, Agent, or Firm—Richards, Medlock & Andrews

[57] ABSTRACT

A thermal cutting machine, capable of providing a high cutting quality and of avoiding any interference between a cut product and the machining nozzle, comprises a workpiece table (4) for supporting a workpiece (5) to be cut, the workpiece table (4) being capable of moving the workpiece in the X-axis direction, and a machining nozzle (2a) for emitting a heat source to cut the workpiece, said machining nozzle (2a) being movable in the Y-axis direction. The workpiece table (4) is provided with a chain conveyer (6) having a plurality of grid elements (11) laterally spanning the chains (10) of the conveyer (6). A retracting means is provided for retracting downwardly at least one grid element (11) which is in the conveyor position corresponding to the cutting path for the machining nozzle, by depressing the portion of the chains (10) which support that grid element. This avoids damage to the grid elements during the cutting operation, and also avoids interference between the machining nozzle and the workpiece or the cut products. The cut workpieces can be classified into products and scraps.

20 Claims, 9 Drawing Sheets

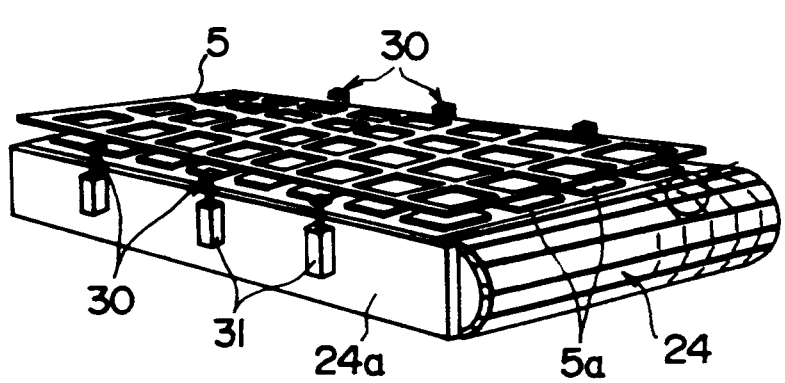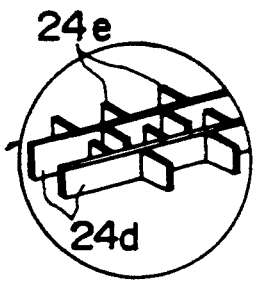
FIG. 10b
FIG. 10a
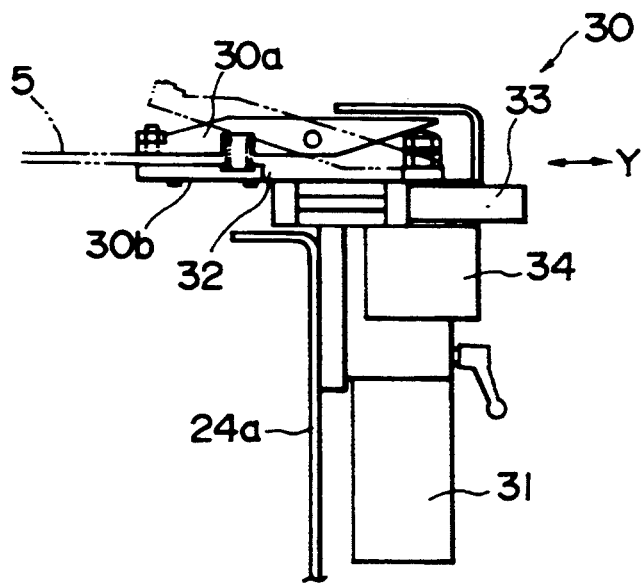
FIG. 11

THERMAL CUTTING MACHINE

FIELD OF THE INVENTION

The present invention relates to a thermal cutting machine, for cutting workpieces by making use of heat, such as a laser beam machine or a plasma machine.

BACKGROUND OF THE INVENTION

In a conventional thermal cutting machine, a workpiece mounted on a workpiece table has been cut by applying heat to the workpiece from the upper side of the workpiece. In order to prevent the workpiece table from being cut along with the workpiece, the workpiece has been supported from below by a workpiece table which is provided with a metallic frog having sharp distal ends (Japanese Unexamined Patent Application (A) 63-224893) or the workpiece has been supported by a workpiece table on which a metallic belt plate is longitudinally arranged (Japanese Published Examined Patent Application (B2) 3-31548).

However, in the former method, where the workpiece is supported by the workpiece table provided with the frog, there has been a disadvantage in that long-term use of the workpiece table causes the distal ends of the frog to wear, thereby enlarging the contact area with the workpiece and degrading the cutting quality of the product. Furthermore, if the product to be produced by the cutting operation is of small size, one side of the product would fall down between the projections of the frog so as to place the product in a tilted position which would interfere with the movement of the machining nozzle in an upright state, thereby damaging the machining nozzle.

In the latter method, where the metallic belt plate is longitudinally arranged on the workpiece table, the contact area of the workpiece table with the workpiece tends to be too large and degrades the cutting quality of the product. In addition, the belt plate must be replaced at frequent intervals because of it is easily damaged during the cutting operation of the workpiece. Further, since both cut products and scraps remain in a mixed state on the workpiece table, manual labor is required to classify them after the cutting operation.

SUMMARY OF THE INVENTION

It is therefore an object of the present invention to provide a thermal cutting machine which is capable of yielding a high cutting quality, of avoiding any interference of a product with the machining nozzle, and of easily performing infeeding/outfeeding operations for the workpieces. Another object of the invention is to provide a thermal cutting machine which does not require any manual classifying operation for the scraps and products after the cutting operation.

In one embodiment, the present invention provides a thermal cutting machine for cutting a workpiece by means of a heat source emitted from a machining nozzle, wherein the workpiece is mounted on a workpiece table which is movable in the X-axis direction, the machining nozzle is movable in the Y-axis direction perpendicular to the X-axis, and the workpiece table is provided with a chain conveyor having a pair of endless chains extending in the X-axis direction, a grid table composed of grid elements laterally spanning the space between the chains of the chain conveyor, and a retracting means which retracts a grid element from contact with the workpiece by pressing against the part of the chains supporting that grid element.

The grid element positioned at the workpiece cutting position can be automatically retracted in the downward direction away from the workpiece, so as to prevent the grid table from being damaged during the cutting operation. Further, since the workpiece is supported by the remainder of the grid table, the machining nozzle would not be damaged by interference with the cut product.

In another embodiment, the present invention comprises a grid table, composed of grid elements laterally spanning the space between the chains of the chain conveyer, the grid table being positioned on the workpiece table for the infeeding/outfeeding of the workpiece on the workpiece table by the chain conveyer; a retracting roller for depressing the belt plate element of the chain conveyer which is at the cutting position; and workpiece clamps for clamping, at both sides of the chain conveyer, the workpiece which is to be cut, and for subsequently lifting the residue of workpiece above the pieces which have been cut from the workpiece.

Since each of the infeeding of the workpiece to the cutting operation and the outfeeding of the cut pieces while the workpiece residue is lifted by the clamps can be automatically carried out by the chain conveyer, the cut products and the scraps can be automatically classified before the outfeeding operation. The belt plate element of the conveyer, which is currently at the cutting position, is depressed by the retracting roller so as not to be cut together with the workpiece.

Other advantages, features and objects of this invention will be manifest to those versed in the art upon making reference to the following detailed description and the accompanying drawings in which structural embodiments incorporating the principles of this invention are shown by way of illustrative examples.

BRIEF DESCRIPTION OF THE DRAWINGS

FIG. 4a is a partially enlarged schematic view of the workpiece table of FIG. 2;

FIG. 4b is a perspective view of a portion of the grid table of FIG. 4a;

FIG. 10a is a perspective view showing clamps provided on opposite sides of the workpiece conveyer of the thermal cutting machine of FIG. 7;

FIG. 10b is a perspective view of a portion of the chain conveyor of FIG. 10a;

FIG. 11 is a detailed diagram of one of the clamps of FIG. 10; and

DETAILED DESCRIPTION OF THE PREFERRED EMBODIMENTS

A first embodiment of this invention will now be described with reference to FIGS. 1 through 6.

Figure 1:
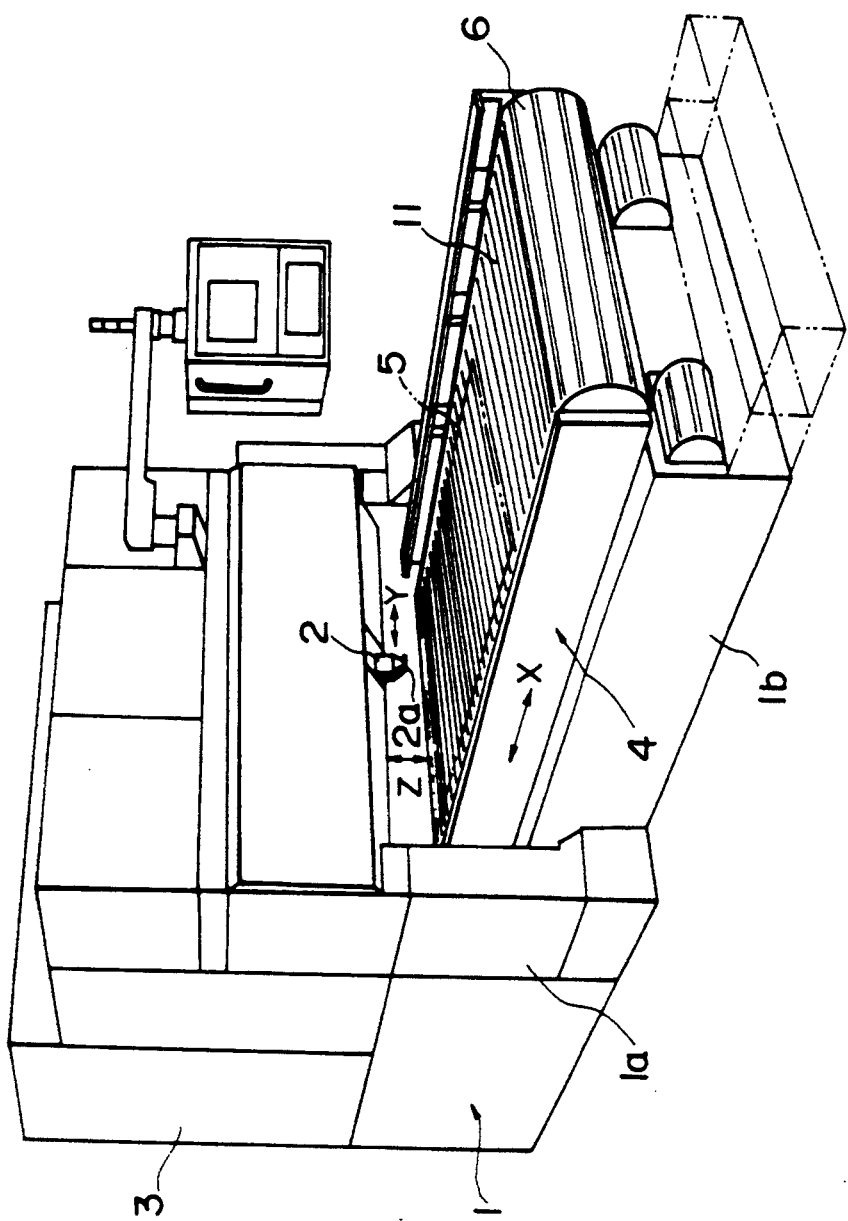
FIG. 1 is a perspective view of a thermal cutting machine according to a first embodiment of the present invention.
Figure 2:
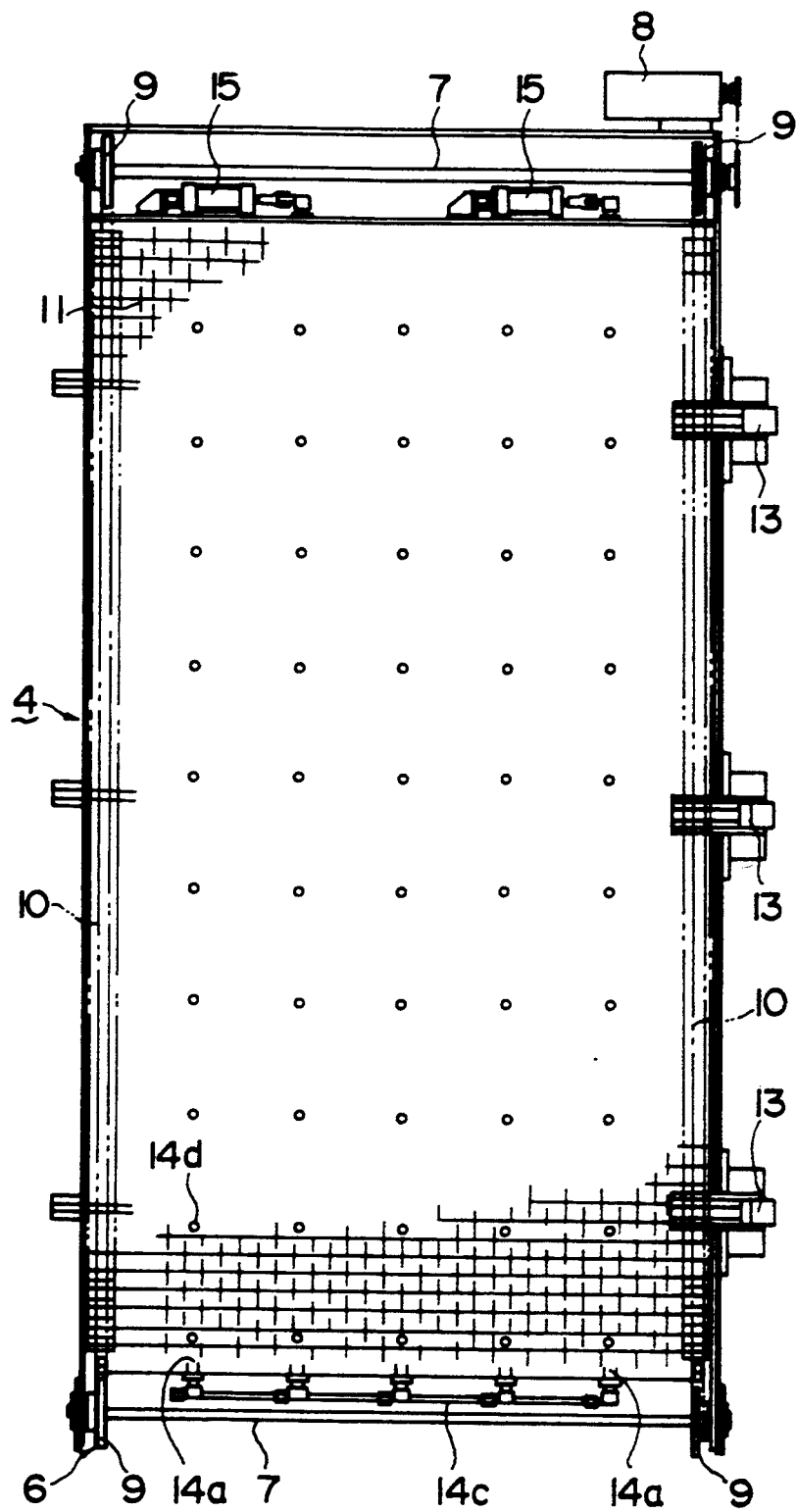
FIG. 2 is a plan view showing the workpiece table of the thermal cutting machine of FIG. 1.

In FIG. 1, a cutting machine body 1 has a gate-like structure 1a, in the form of an inverted U, positioned above a bed structure 1b. A workpiece table 4 is mounted on the bed structure 1b of the cutting machine body 1 and is provided with a conveyor 6 to infeed workpieces 5 on the workpiece table 4 of the cutting machine and to remove cut pieces from the cutting machine. The conveyor 6 has a horizontal conveying direction (X-axis direction) which is at least generally perpendicular to the structure 1a and a horizontal transverse direction (Y-axis direction, which is perpendicular to the X-axis direction) which is at least generally parallel to the structure 1a. A plurality of workpiece clamps 13, for clamping the workpiece 5 during the cutting operation, are mounted at one side of the workpiece table 4, as shown in FIG. 2.

A machining nozzle unit 2 is disposed at the upper portion of the structure 1a and has a machining nozzle 2a directed downwardly toward a workpiece 5 on the workpiece table 4. The machining nozzle unit 2 is mounted on the upper portion of the structure 1a so as to be movable both in the Y-axis direction in parallel to the structure 1a and in the Z-axis direction, i.e., the vertical direction. A laser oscillator 3 oscillates a laser beam which is then introduced through a duct (not shown) into the machining nozzle unit 2 to be emitted toward the workpiece 5 on the workpiece table 4 from the distal end of the machining nozzle 2a.

The workpiece table 4 comprises a chain conveyer 6 having a pair of rotatable shafts 7 which extend in the Y-axis direction and are mounted parallel to each other at opposite ends of the workpiece table 4. Each end portion of each rotatable shaft 7 is provided with a sprocket 9. A pair of endless chains 10 are positioned parallel to each other on opposite sides of the workpiece table 4. The chains 10 extend along the longitudinal direction of the workpiece table 4 (i.e., the X-axis direction), with each chain 10 being fitted between the sprockets 9 on the respective side of the workpiece table 4, such that one straight chain run of each chain 10 is directly above the other straight chain run of that chain 10. One of the shafts 7 is rotatably driven by a bidirectional conveyer motor 8 so as to simultaneously drive the chains 10, with the direction of movement of the chains 10 being either forwardly or rearwardly as determined by the direction of rotation of the motor 8.

A grid table 11, which laterally spans the space between the chains 10, has a plurality of longitudinal bridge elements 11a formed as belt plates extending in the Y-axis direction between the pair of chains 10, as shown in FIGS. 4a and 4b. Thus, the bridge elements 11a are parallel to each other, are spaced apart from each other in the X-axis direction, and the opposite ends of each bridge element 11a are supported by the pair of chains 10. Each of the forward side and the rearward side of the longitudinal bridge elements 11a is provided with a plurality of short lateral support elements 11b projecting perpendicularly from the longitudinal bridge element 11a in the X-direction, with each support element 11b having a length which is less than the distance between adjacent longitudinal bridge elements 11a. The lateral support elements 11b on one side of a bridge element 11a are spaced apart from each other along the length of the respective bridge element 11a and are preferably at least generally parallel to each other. However, while the lateral support elements 11b are generally spaced apart from each other at equal intervals along the length of the bridge elements 11a, the lateral support elements 11b are omitted in the areas of the supporting rods 14b of workpiece lifter 14.

Figure 3:
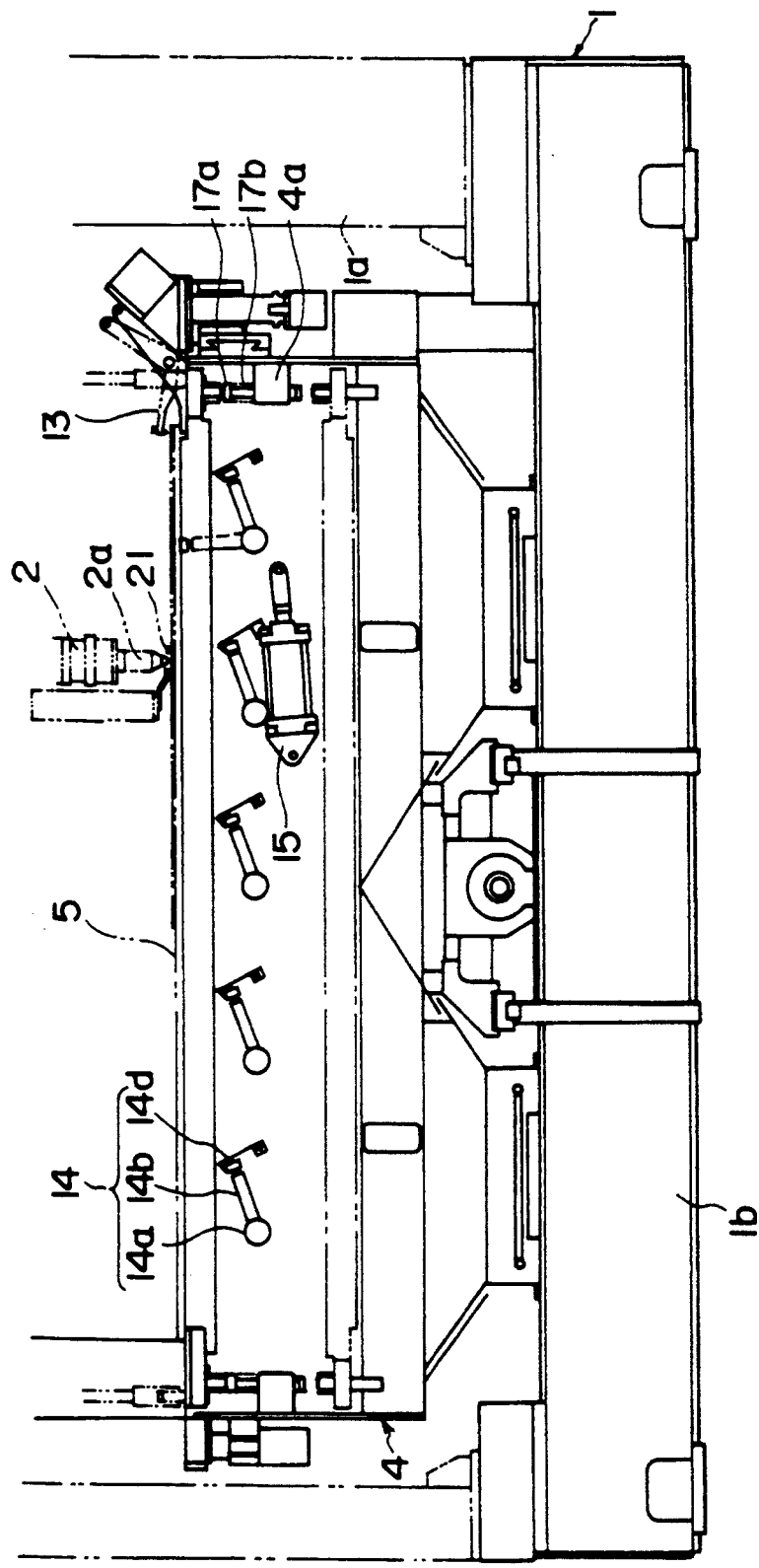
FIG. 3 is an enlarged end view of the workpiece table of FIG. 2.
Figure 4:
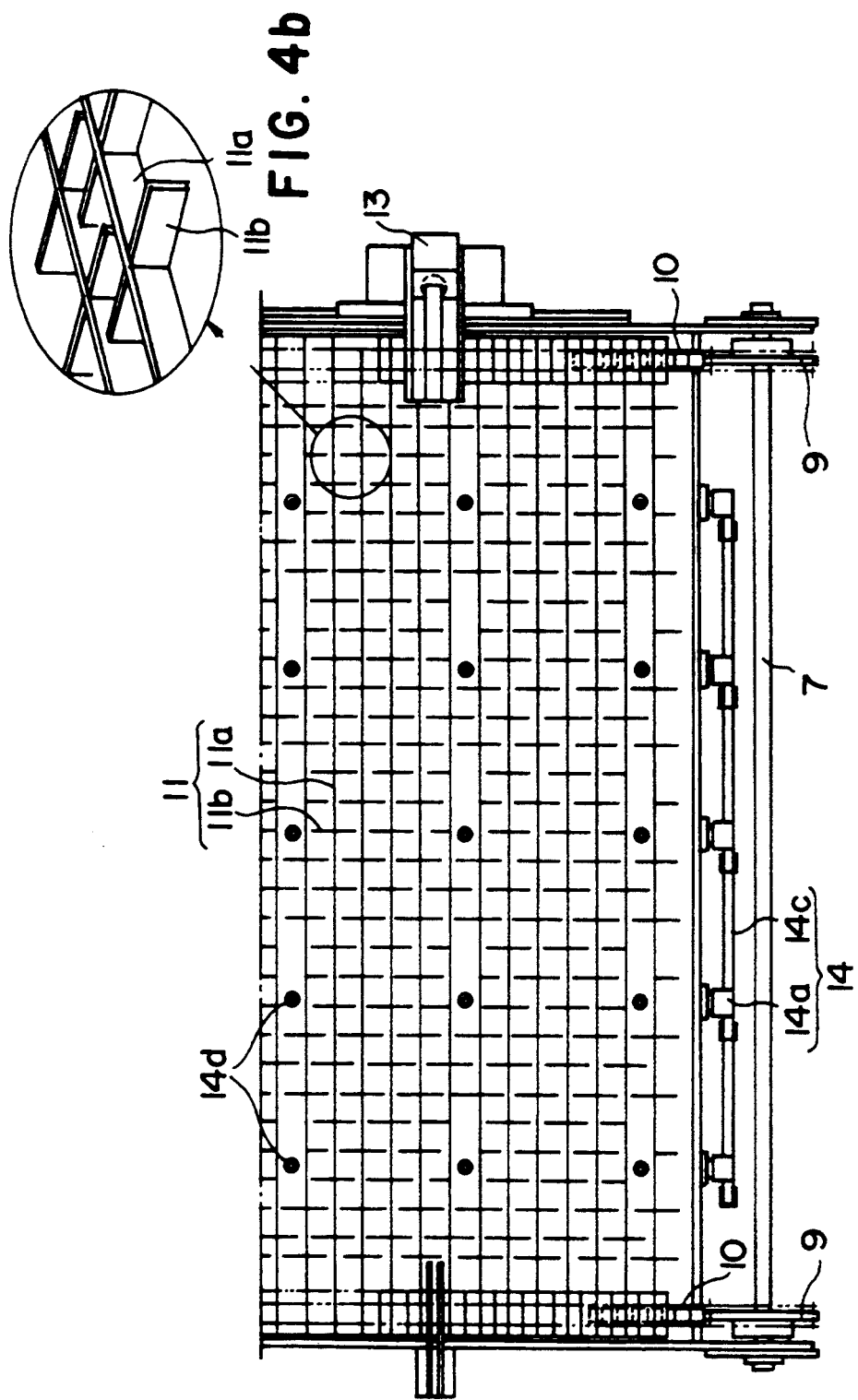

The workpiece lifter 14, which is used for infeeding and positioning the workpiece 5, has a plurality of supporting rods 14b. The lower end of each supporting rod 14b is attached to and supported by one of a plurality of rotatable shafts 14a which extend in the X-axis direction, as shown in FIGS. 3 and 4a. Thus, each rotatable shaft 14a supports a plurality of the supporting rods 14b at spaced apart locations along the length of the respective shaft 14a. Each supporting rod 14b has a free bearing 14d mounted on the distal end of the supporting rod 14b, i.e., the end which is remote from the respective shaft 14a. One end of each rotatable shaft 14a is interlocked with the others via gearing and a rotatable shaft 14c which extends in the Y-axis direction. The other end of at least one of the rotatable shafts 14a is connected via a lever to a lift cylinder 15 for rotating the rotatable shafts 14a, as shown in FIG. 2.

When the rotatable shafts 14a are rotated by the lift cylinders 15, each supporting rod 14b will be rotated from its retracted position represented by solid lines in FIG. 3 to an elevated position illustrated in dashed lines for the right hand most supporting rod 14b in FIG. 3, thereby raising the distal ends of the supporting rods 14b. In the elevated position of the supporting rods 14b, the free bearings 14d project slightly above the upper surface of the grid table 11 to provide bearing surfaces for the workpiece 5. By positioning the workpiece 5 on these free bearings 14d, the workpiece 5 can be easily moved in any desired direction in the X-Y plane.

Figure 5:
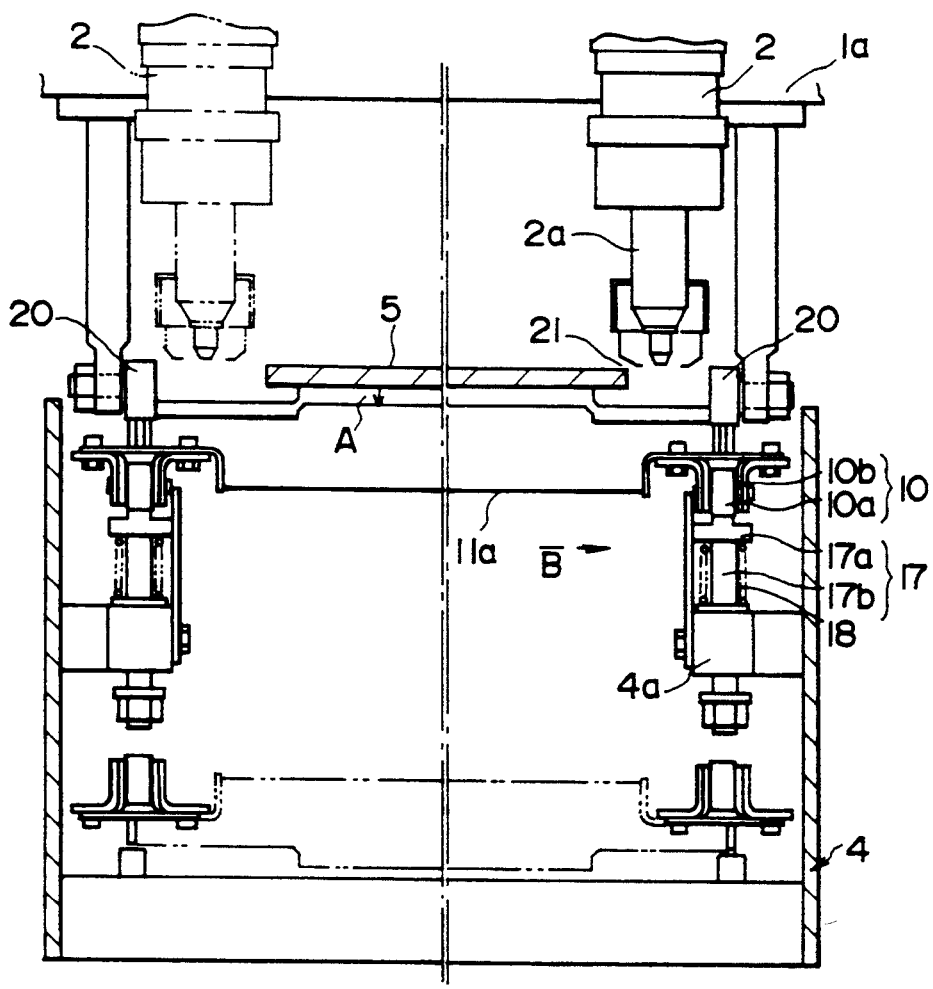
FIG. 5 is an enlarged cross-sectional view of a retracting mechanism provided in the workpiece table of FIG. 2.
Figure 6:
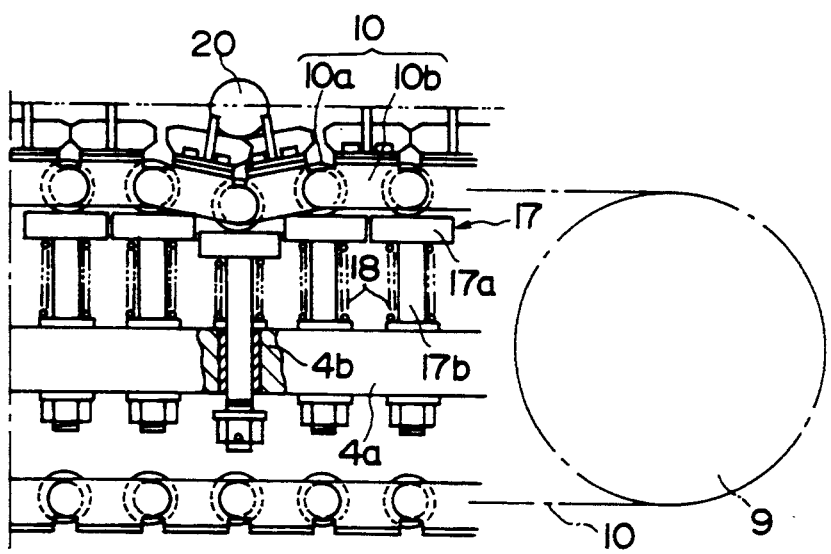
FIG. 6 is a partial cross-sectional view of the retracting mechanism of FIG. 5, seen in the direction of arrow B in FIG. 5.

Two guide rails 17, for supporting the upper runs of the chains 10 from below, are positioned between the upper run and the lower run of the respective chain 10 supporting the grid table 11, as shown in FIGS. 5 and 6. Each chain 10 is composed of a number of rollers 10a and links 10b for connecting adjacent rollers 10a. Each guide rail 17 is divided into a plurality of longitudinally spaced rail segments 17a, each rail segment 17a being of sufficient length to support one roller 10a in the upper run of the respective chain 10 from below that upper chain run.

Each rail segment 17a is attached to the upper end of a respective guide member or rod 17b. Each guide rod 17b extends downwardly from the associated rail segment 17a through a respective bushing 4b mounted in the supporting frame 4a, with a retention nut being provided on the lower end of the guide rod 17b below the bushing 4b. Each guide rod 17b is biased upwardly by a respective compression coil spring 18 positioned around the guide rod 17b between the bushing 4b and the guide rail segment 17a, such that the rail members 17a are normally at substantially the same level. Thus, each guide rod 17b is slidably supported in the vertical direction on the supporting frame 4a through the respective bushing 4b.

A grid retracting roller 20 is mounted on the machine body 1 above the upper run of each chain 10, with the location of the two grid retracting rollers 20 being in a line in the Y-axis direction which corresponds with the path of movement of the machining nozzle unit 2 in the Y-axis direction. Each grid retracting roller 20 presses the roller 10a in the upper run of the respective chain 10, which is the position corresponding to the Y-axis movement path of the machining nozzle unit 2, downwardly against the bias of the spring 18 on the respective guide rail segment 17a. Thus, the Y-axis movement path of the machining nozzle unit 2, the two grid retracting rollers 20, and the two rollers 10a and the longitudinal bridge element 11a which are in the position corresponding to the Y-axis movement path of the machining nozzle unit 2, are generally at least substantially in the same vertical plane.

Element 21 is mounted on the machining nozzle unit 2 so as to make contact with the upper surface of the workpiece 5 during the cutting operation and thereby maintain constant the vertical distance between the workpiece 5 and the machining nozzle 2a during the cutting operation.

The operation of this first embodiment will now be described. The infeeding and positioning of the workpiece 5 on the workpiece table 4 is carried out by placing the workpiece 5 on the conveyor 6, rotating the supporting rods 14b of the workpiece lifter 14 to their elevated positions, and moving the workpiece 5 on the free bearings 14d at the upper ends of the supporting rods 14b. Upon completion of the initial positioning of the workpiece 5, an edge of the workpiece 5 is clamped by the workpiece clamps 13 and the workpiece lifter 14 is rotated downwardly to deposit the workpiece 5 on the grid table 11. The conveyor 6 then moves the workpiece table 4 in the X-axis direction, and the machining nozzle unit 2 moves in the Y-axis direction to cut the workpiece 5 on the grid table 11. One position of the machining nozzle unit 2 is represented by solid lines in the right half of FIG. 5, while another position of the machining nozzle unit 2 is illustrated in dashed lines in the left half of FIG. 5, with these being but two of many possible positions of the nozzle 2a along its Y-axis movement path.

As each longitudinal bridge element 11a reaches the conveyor position corresponding to the Y-axis movement path of the machining nozzle unit 2 during the movement of the conveyor 6 in the X-axis direction, the grid retracting rollers 20 press down on the then adjacent links 10b of the upper runs of chains 10, as shown in FIG. 6, to move that longitudinal bridge element 11a downwardly and away from the portion of the workpiece 5 being cut. Thus, since the level of the longitudinal bridge element 11a positioned in line with the Y-axis movement path of the machining nozzle unit 2 is lower than the other longitudinal bridge elements 11a, as shown by arrow A in FIG. 5, it is possible to perform the cutting operation on the workpiece 5 with a laser without cutting the grid table 11.

When the workpiece table 4 is subsequently moved in the X-axis direction, the link 10b, which had been pressed down, in each chain 10 is removed from contact with the associated grid retracting roller 20 so that the depressed longitudinal bridge element 11a is lifted by the effect of the compression spring 18 on the next guide rail segment 17a. On completion of the machining of the workpiece 5 on the grid table 11, the workpiece clamps 13 are disengaged from the workpiece 5.

Although the first embodiment of this invention has been described in terms of a laser beam machine, it can also be applied to a plasma machine or other types of thermal cutting machines.

Since the grid portion of the grid table is never cut together with the workpiece in the first embodiment of this invention, the durability of the workpiece table is significantly enhanced. Further, since the grid is not in contact with the portion of the workpiece being cut during the cutting operation, a flow of an assistant gas is not impeded by the grid nor is the laser beam reflected by the grid, thereby avoiding the generation of a notching phenomenon at the lower surface of the product, and enabling high-quality cutting operation. In addition, by virtue of the closely spaced supports of the grid table, any interference of a cut portion of the workpiece with the machining nozzle does not arise, so that manual monitoring of the cutting operation is not required, thereby saving labor.

A second embodiment of the present invention will now be described. Components of the second embodiment which are the same as in the first embodiment are designated by the same reference numerals, so that some of the detailed explanation thereof is omitted.

Figure 7:
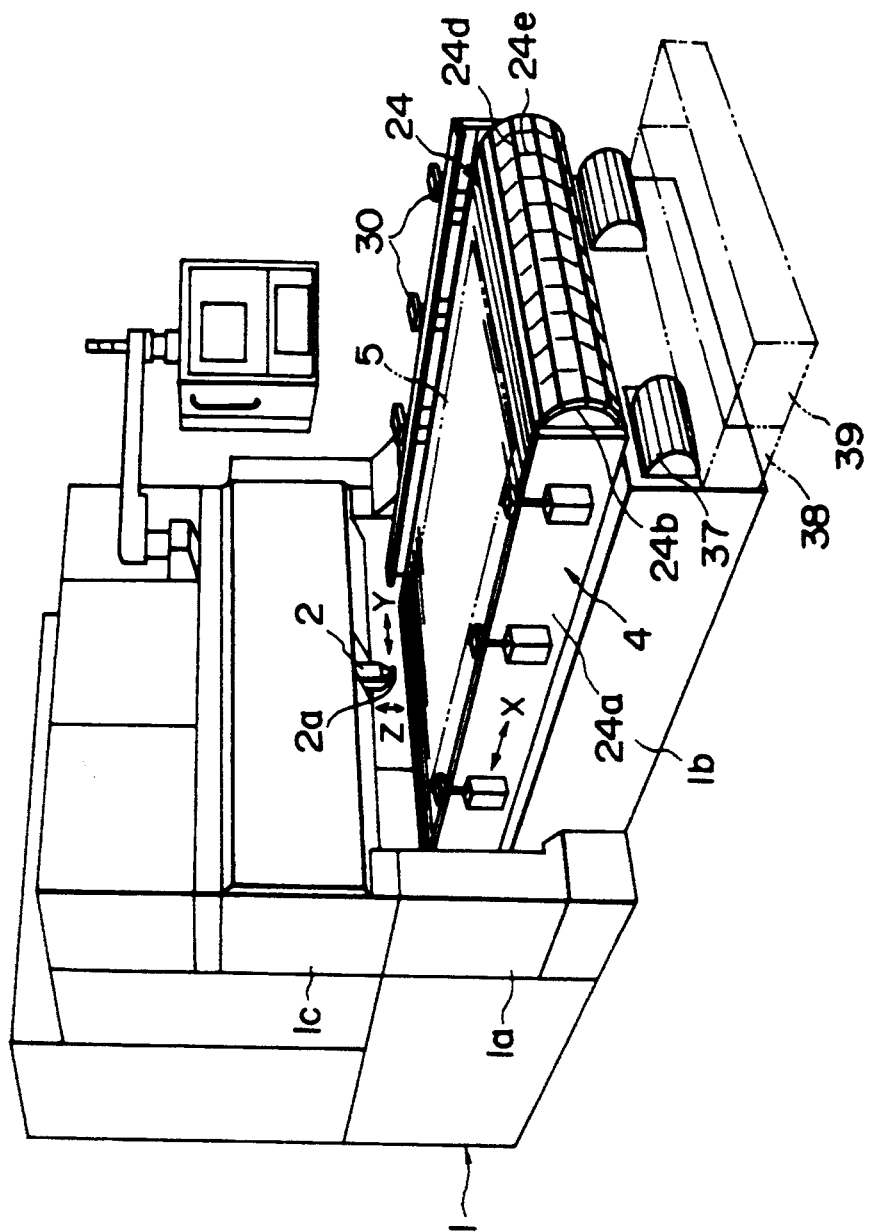
FIG. 7 is a perspective view of a thermal cutting machine according to a second embodiment of the present invention.

In FIG. 7, the workpiece table 4 is positioned on the bed 1b and below the frame 1c, with the longitudinal axis of the workpiece table 4 extending in the X-axis direction which is perpendicular to the direction of the frame 1c. The workpiece table 4 provides movement in the X-axis direction by including a chain conveyer 24 for infeeding/outfeeding of the workpiece 5 on the workpiece table 4 in the X-axis direction. The chain conveyer 24 has a pair of endless chains 24b positioned parallel to each other on opposite sides of the workpiece table 4. The chains 24b extend along the longitudinal direction of the workpiece table 4 (i.e., the X-axis direction), such that one straight chain run of each chain 24b is directly above the other straight chain run of that chain 24b.

Figure 8:
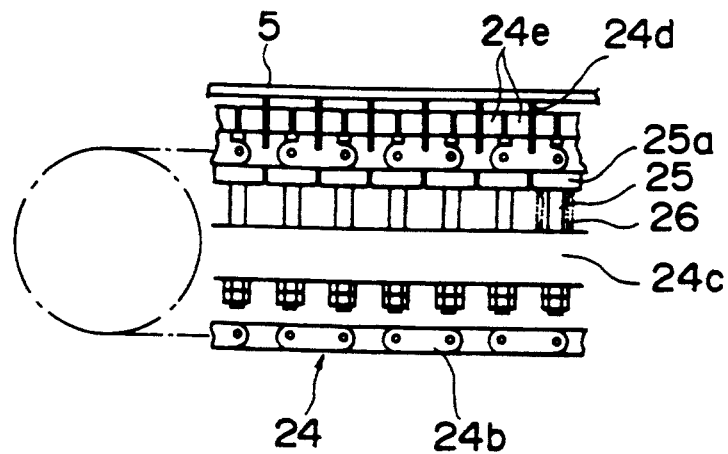
FIG. 8 is a diagram showing some of the details of the workpiece conveyer of the thermal cutting machine of FIG. 7.

Side plates 24a are provided along each longitudinally extending side of the chain conveyer 24. Each endless chain 24b is positioned adjacent the inner side of a respective side plate 24a, with the chains 24b being driven by a bidirectional conveyer motor (not shown). As shown in FIG. 8, the upper run of each chain 24b is supported from below by a plurality of supporting rail segments 25a, with each rail segment 25a being supported by a respective supporting rod 25. The rods 25 extend through and are vertically movable in a supporting structural member 24c, which is mounted on the adjacent side plate 24a. The lower end of each supporting rod 25 has a retention nut secured thereto, while a coiled compression spring 26 is positioned coaxially with the rod 25 between the supporting structural member 24c and the rail segment 25a so as to upwardly bias the respective rod 25 such that the upper ends of the rail segments 25a are normally at the same level.

Long belt plate elements 24d laterally span the space between the chains 24b in the Y-axis direction, with the opposite ends of each long belt plate element 24d being supported by the pair of chains 24b. The long belt plate elements 24d are parallel to each other, and are equally spaced apart from each other in the X-axis direction with the interval between the long belt plate elements 24d being the same as the interval between the supporting rods 25. Each of the front side and the back side of each of the long belt plate elements 24d is provided with a plurality of short lateral support elements 24e projecting perpendicularly from the long belt plate element 24d in the X-direction, with each support element 24e having a X-axis dimension which is less than the distance between adjacent long belt plate elements 24d. The lateral support elements 24e on one side of a long belt plate element 24d are at least generally parallel to each other and are spaced apart from each other along the length of the respective plate element 24d. The lateral support elements 24e on one side of a long belt plate element 24d can be mounted in alternating positions with respect to the lateral support elements 24e on the other side of the long belt plate element 24d, to form a grid-like workpiece mounting platform.

Figure 9:
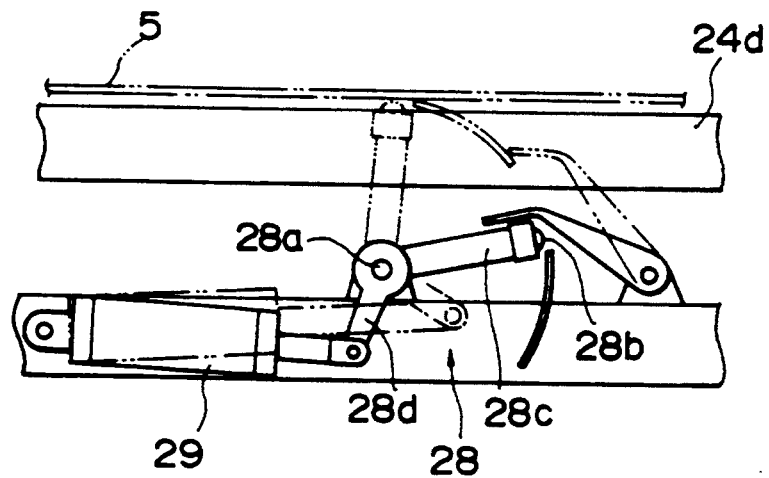
FIG. 9 is a diagram of details of a workpiece lifter provided in the thermal cutting machine of FIG. 7.
Figure 12:
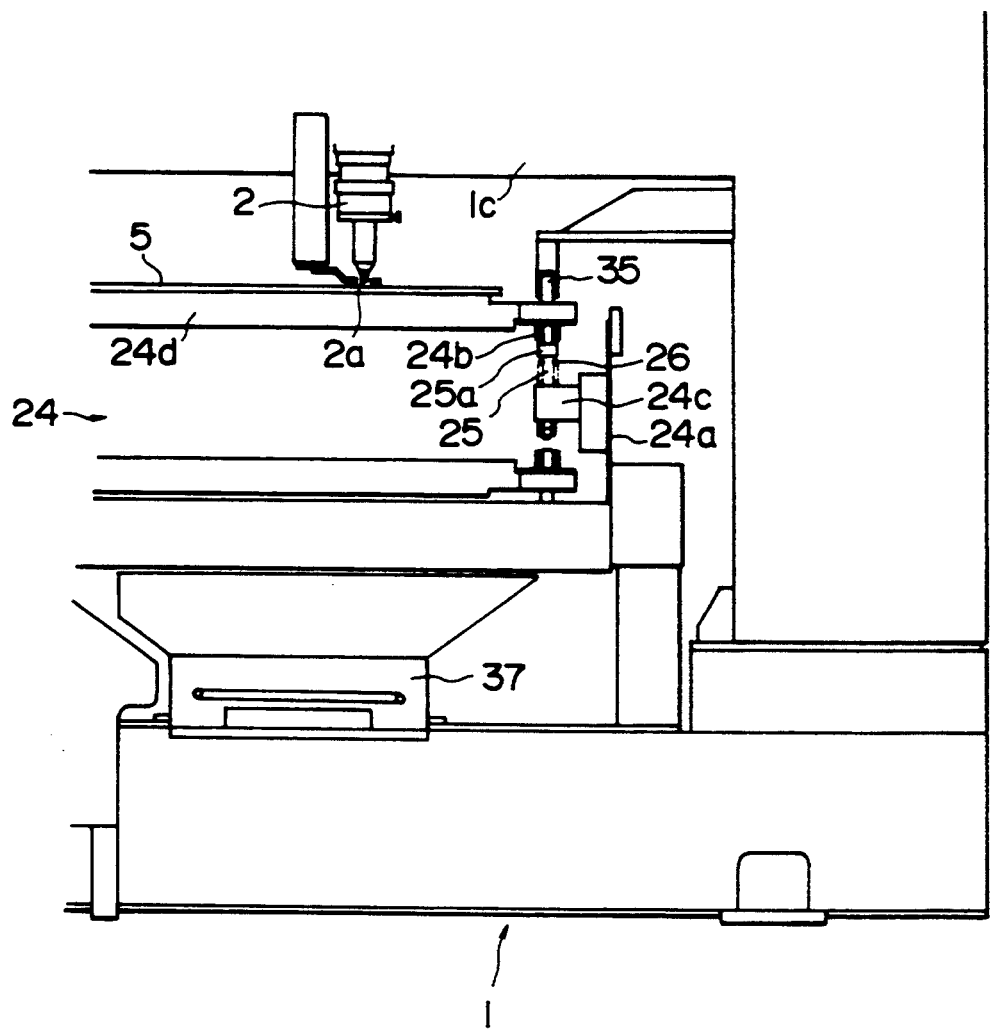
FIG. 12 is a diagram showing details of a retracting mechanism of the thermal cutting machine of FIG. 7.

Under the workpiece mounting platform, a workpiece lifter 28 is used for positioning the workpiece 5 on the conveyor 24 in either the X-axis direction or the Y-axis direction. Although only one workpiece lifter 28 has been shown in FIG. 9, in practice a plurality of rotatable shafts 28a are mounted in the Y-axis direction, and each rotatable shaft 28a has attached thereto the base end portions of a plurality of supporting rods 28c. Each supporting rod 28c has a free bearing 28b at its distal end. An operational cylinder 29 is connected to one end portion of each rotatable shaft 28a through a lever 28d. The operational cylinder 29 rotates the rotatable shafts 28a to move the supporting rods 28c between a retracted or stand-by position illustrated by solid lines in FIG. 9 and an upright or extended position, illustrated by dashed lines in FIG. 9.

A plurality of workpiece clamps 30 are disposed along each side plate 24a of the chain conveyer 24 at predetermined intervals in the X-axis direction, as shown in FIG. 10a. The workpiece clamps 30 on each side of the conveyor 24 are mounted on a respective supporting member 32, which is movable vertically by a lift cylinder 31 and which is movable in the Y-axis direction by a retracting cylinder 33. Each workpiece clamp 30 holds an edge portion of the workpiece 5 between a movable claw 30a and a stationary claw 30b. The movable claw 30a is movable between an open position and a closed position by a clamp cylinder 34.

Two retracting rollers 35 are rotatably supported on the lower surface of the frame 1c of the machine body 1 directly above the upper runs of the corresponding chains 24b, with the location of the two rollers 35 being in a line in the Y-axis direction which corresponds with the path of movement of the machining nozzle unit 2. Thus, the Y-axis movement path of the machining nozzle unit 2, the two grid retracting rollers 35, and the two chain links and supporting rods 25 and the long belt plate element 24d which are in the position corresponding to the Y-axis movement path of the machining nozzle unit 2, are generally at least substantially in the same vertical plane. These retracting rollers 35 provide a downwardly pressing force through the chains 24b on the ends of the long belt plate element 24d which is in the position corresponding to the Y-axis movement path of the machining nozzle unit 2, so as to protect that long belt plate element 24d from damage during the cutting operation on the workpiece 5.

As shown in FIG. 7, other components of the machine include a scrap conveyer 37 which is disposed below the conveyer 24, a scrap box 38 for collecting scraps discharged from the scrap conveyer 37, and a product box 39 for collecting the products 5a discharged from the conveyer 24.

The operation of this second embodiment will now be described. When the workpiece 5 has been conveyed by the chain conveyer 24 to a predetermined position, the supporting rods 28c of the workpiece lifter 28 are moved by lift cylinder 29 from the retracted position shown by solid lines in FIG. 9 to the extended position shown by dashed lines, so that the rods 28c support the workpiece 5 through the free bearings 28b. In this state, the workpiece 5 is moved in the Y-axis direction by a pressing mechanism (not shown) to a desired position. Thereafter, both side edges of the workpiece 5 are held by the workpiece clamps 30.

Subsequently, the workpiece 5 is moved in the X-axis direction while the machining nozzle unit 2 is moved in the Y-axis direction by a NC (numerically controlled) apparatus (not shown), thereby starting the cutting operation on the workpiece 5 on the chain conveyer 24. Meanwhile, each long belt plate element 24d which reaches the conveyer position corresponding to the Y-axis moving path of the machining nozzle unit 2 during the cutting operation is pressed down by the retracting rollers 35 through the chains 24b, thereby preventing the belt plate elements 24d, 24e from being cut by the laser or plasma emitted from the machining nozzle 2a.

Small scraps generated during the cutting operation can fall down through the spaces between the grid-like belt plates 24d and 24e onto the scrap conveyer 37, which transfers them into the scrap box 38.

Upon completion of the cutting operation, the residue of the workpiece 5, in a state of being clamped at both side edges by the clamps 30, is lifted above the chain conveyer 24 by the lift cylinders 31, shogun in FIGS. 10a and 11. As a result, only cut out products 5a remain on the chain conveyer 24, which is then rotated to transfer the products 5a into the product box 39 for collection.

When the collection of the products 5a is finished, the workpiece clamps 30 are lowered by the lift cylinders 31 in order to position the reside of the workpiece 5 on the chain conveyer 5 to be removed from the machine. Thereafter, the same operations can be repeated to cut a plurality of workpieces 5.

Thus, while this second embodiment achieves each of the advantages obtained by the first embodiment, it also achieves the additional advantage in that the thermal cutting machine can be automatically driven, since the infeeding of the workpiece to be cut and the outfeeding of the residue of the workpiece after the cutting operation has been completed can be automatically carried out by the conveyer. Further, the scraps and the products can be automatically classified before being removed from the machine, thereby avoiding a need for manual classifying labor.

Reasonable variations and modifications are possible within the scope of the foregoing description, the drawings and the appended claims to the invention. For example, the short supporting elements 11b and 24e can be omitted when the distance between elements 11a or elements 24d is sufficiently small so as to provide adequate support. The short elements 11b and 24e can be positioned at acute angles to the long support elements 11a or 24d instead of being perpendicular thereto, and can have configurations other than rectangular. The short supporting elements can be provided on only one side of the long support element rather than on both sides. The retracting rollers can depress two or more grid elements 11a or 24d at the conveyer position corresponding to the Y-axis moving path of the machining nozzle unit 2 during the cutting operation instead of the single grid element illustrated.

What is claimed is:

1. A thermal cutting machine for cutting a workpiece, said machine comprising a workpiece table for supporting the workpiece and for moving the workpiece in the X-axis direction, and a machining nozzle for emitting a heat source against the workpiece positioned on the workpiece table, said machining nozzle being movable in a Y-axis direction path which is perpendicular to the X-axis direction; wherein said workpiece table comprises:

a chain conveyor having a pair of parallel spaced-apart endless chains;

a grid table composed of grid elements laterally spanning the space between said chains and being supported by said chains, said chain conveyor being positioned such that at least one grid element is located in a position which corresponds to the Y-axis direction path of said machining nozzle; and a retracting means for retracting the at least one grid element which is located in the position which corresponds to the Y-axis direction path of said machining nozzle, by depressing the part of the chains supporting said at least one grid element.

2. A thermal cutting machine according to claim 1, wherein each of said chains comprises a plurality of chain links connected together; and wherein each of said grid elements comprises a long support member spanning the space between said chains; and wherein the ends of each long support member are supported by a respective chain link in each of the chains.

3. A thermal cutting machine according to claim 2, wherein each of said grid elements further comprises a plurality of short support members projecting outwardly from at least one side of the long support member, with the plurality of short support members on a side of the long support member being spaced apart from each other along the length of the long support member.

4. A thermal cutting machine according to claim 3, wherein each of the short support members has an X-axis dimension which is less than the X-axis distance between adjacent long support members.

5. A thermal cutting machine according to claim 4, wherein the long support members are spaced apart at equal intervals in the X-axis direction.

6. A thermal cutting machine according to claim 5, wherein the short support members project outwardly at least generally in the X-axis direction from each side of each long support member.

7. A thermal cutting machine according to claim 6, wherein said machine further comprises a workpiece lifter associated with said workpiece table, said workpiece lifter comprising a plurality of supporting elements movable between a retracted position below said grid elements and an extended position wherein tips of the supporting elements extend above said grid elements so as to support the workpiece thereon.

8. A thermal cutting machine according to claim 7, wherein the distal end of each of said supporting elements is provided with a bearing to form the tip of the respective supporting element.

9. A thermal cutting machine according to claim 8, wherein said short support elements are omitted in the areas wherein the supporting elements would extend above the grid elements.

10. A thermal cutting machine according to claim 9, wherein said retracting means is composed of a pair of retracting rollers which are rotatably supported over the chains along a line in the Y-axis direction which corresponds to the Y-axis direction path of the machining nozzle.

11. A thermal cutting machine according to claim 10, further comprising at least one workpiece clamp for holding the workpiece to be cut.

12. A thermal cutting machine according to claim 10, further comprising at least one workpiece clamp adjacent to one side of the chain conveyor and at least one workpiece clamp adjacent to the other side of the chain conveyor for lifting the residue of workpiece after the cutting operation has been completed.

13. A thermal cutting machine according to claim 12, further comprising a scrap conveyor positioned below said chain conveyor to receive scraps which fall through said chain conveyor.

14. A thermal cutting machine according to claim 1, wherein said machine further comprises a workpiece lifter associated with said workpiece table, said workpiece lifter comprising supporting elements movable between a retracted position below said grid elements and an extended position wherein tips of the supporting elements extend above said grid elements so as to support the workpiece thereon.

15. A thermal cutting machine according to claim 14, wherein said workpiece lifter further comprises a plurality of rotatable shafts, wherein each rotatable shaft is connected to the base of each of a plurality of the supporting elements, and wherein the distal end of each of the supporting element has a free bearing mounted thereon to form the tip of the respective supporting element.

16. A thermal cutting machine according to claim 1, wherein said retracting means is composed of a pair of retracting rollers which are rotatably supported over the chains along a line in the Y-axis direction which corresponds to the Y-axis direction path of the machining nozzle.

17. A thermal cutting machine according to claim 1, further comprising at least one workpiece clamp for holding the workpiece to be cut.

18. A thermal cutting machine according to claim 1, further comprising at least one workpiece clamp adjacent to one side of the chain conveyor and at least one workpiece clamp adjacent to the other side of the chain conveyor for lifting the residue of workpiece after the cutting operation has been completed so that the resulting cut product can be conveyed away separately from said residue.

19. A thermal cutting machine according to claim 1, further comprising a scrap conveyor positioned below said chain conveyor to receive scraps which fall through said chain conveyor.

20. A thermal cutting machine according to claim 1, wherein the grid elements are spaced apart at equal intervals in the X-axis direction.

* * * * *